A. E. BRIGGS,

Assignor to Post & Co.

MAGNETO ELECTRIC MACHINE.

No. 9,993. Reissued Dec. 27, 1881.

Witnesses:

Dupetha D. Garrard

Joseph Cox Jr

Inventor:

Arthur E. Briggs

UNITED STATES PATENT OFFICE.

ARTHUR E. BRIGGS, OF CINCINNATI, OHIO, ASSIGNOR TO POST & CO., OF SAME PLACE.

MAGNETO-ELECTRIC MACHINE.

SPECIFICATION forming part of Reissued Letters Patent No. 9,993, dated December 27, 1881.

Original No. 226,386, dated April 13, 1880. Application for reissue filed November 1, 1881.

*To all whom it may concern:*

Be it known that I, ARTHUR E. BRIGGS, of Cincinnati, in the county of Hamilton and State of Ohio, have invented a certain new and useful Improvement in Magneto-Electric Machines; and I do hereby declare the following to be a full, clear, and exact description of the same, reference being had to the accompanying drawings, forming part of this specification, in which—

Figure 1:
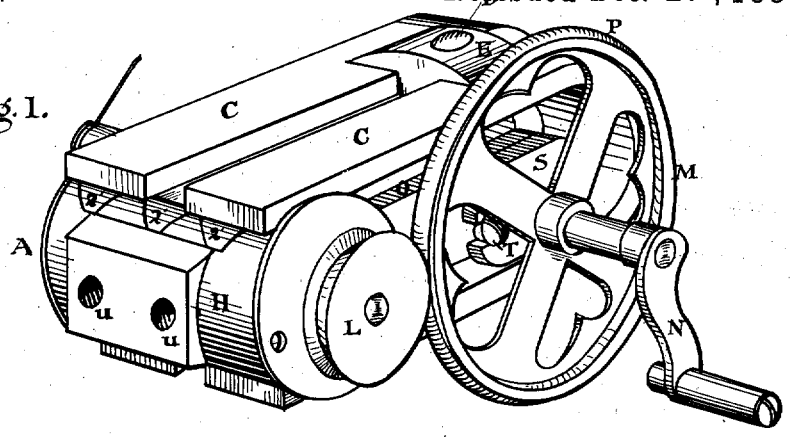
Figure 2:
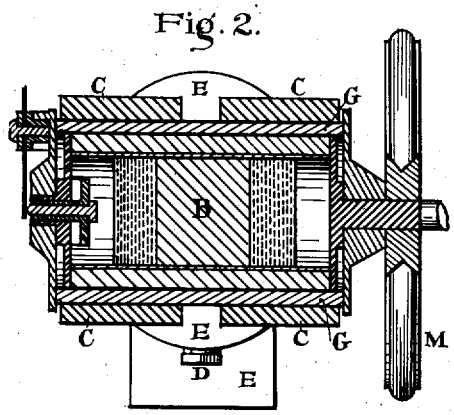
Figure 4:
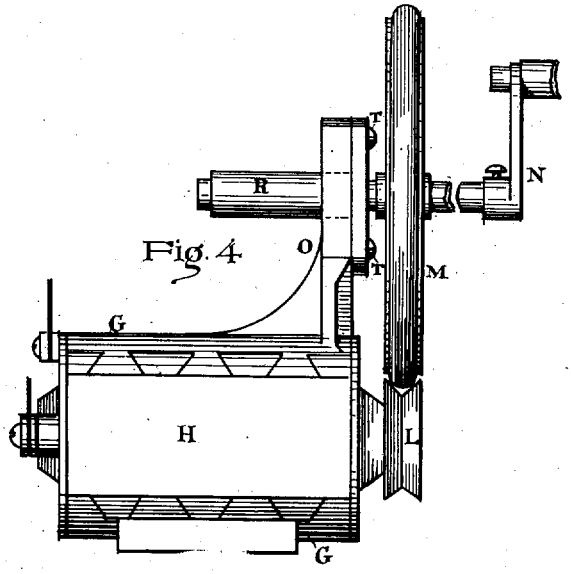
Figure 3:
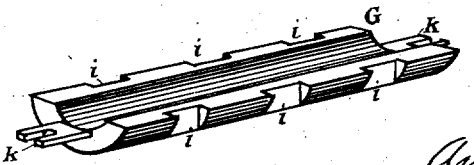

Figure 1 is a perspective view of a magneto-engine, showing my improvements. Fig. 2 is a longitudinal section through the cylinder of the engine. Fig. 3 is a perspective view of one of the cast-iron sides of the cylinder, and Fig. 4 is a top view of the cylinder with the magnets removed.

Similar letters of reference in the several figures denote the same parts.

My invention relates to the manufacture and use of magneto-engines or electric generators of that class in which a cylinder is employed located between the two poles of a magnet and containing a revolving armature and coil, by which the current is generated and transmitted; and it has for its object to improve the construction of the cylinder and cheapen the cost of its production, and to insure the more effective working of the engine, as I will now proceed to describe.

In the accompanying drawings, A represents the cylinder; B, the armature and the coil therein, and C C two magnets of the horseshoe pattern, which embrace the cylinder between their poles, and are clamped to each other by the bolt D and blocks E E.

The cylinder in this class of electric generators is composed of two cast-iron plates, G G, at the upper and lower sides bearing against the magnets, and of two brass plates, H H, interposed between the cast-iron plates, to which they are secured.

It has heretofore been the custom to cast the iron and brass plates separately and then rivet or screw them together, the contact-surfaces being first filed down or milled, to insure the necessary bearings and an accurate fit. This construction is objectionable and defective, because of the expense and labor attending the working and fitting of the plates, and because they cannot be so securely fastened together as to prevent them from working loose after the generator has been in use for a considerable length of time.

To overcome these objections and defects, I first cast the upper and lower iron plates in the form shown in Fig. 3, with dovetail recesses *i i* in each outer edge and a flat outer surface to bear against the permanent magnets. Two of these plates are cast for a cylinder, and are secured together in the following manner: One plate is first placed in the sand, with the concave side uppermost. A core is then laid upon the upper side, and the top plate laid upon the core. The molten brass is then poured into the mold, filling the spaces between the two plates and entering the dovetail recesses *i i*, to form the dovetail keys. As the brass cools its contraction is greater than the iron, and the result is that the dovetail keys are drawn firmly into the dovetail spaces and a secure and permanent lock is produced, as shown in the drawings, without milling, filing, or otherwise preparing the plates to produce a perfect fit. To finish the cylinder thus formed, it is only necessary to bore it out accurately to receive the armature.

The projecting ends K K of the iron plates shown in Fig. 3 are employed merely to sustain the plates in the sand, and are removed when the casting of the cylinder is completed.

The cylinder made in the ordinary way is not a true circle inside. The armature therefore cannot be turned down to make a neat fit, so that through its whole length it may be as near as possible to the magnet; but it is essential to the effective working of the engine that the armature shall be throughout its whole length as near as possible to the magnet, because the strength of the current is inverse to the square of the distance of the armature from the magnet; but in my invention the metal plates are cast together, and the cylinder thus formed is reamed out to a true circle. The armature is also turned to a true circle, thus bringing it through its whole length the nearest possible to the magnet. The cylinder, being solid, cannot, by the wear and tear of use, or by the driving on of the magnets, get out of line with the armature.

The generator is usually applied to use, particularly for telephonic lines, by placing it within a box, and the armature is rotated by a grooved pulley, L, on its projecting end, driven by a larger pulley, M, mounted on a crank-shaft, N, whose bearings are in the side of the box, and a projecting arm, O, forming part of the brass casting and extending between the two magnets. The crank is arranged outside the box in the usual manner, and the large pulley carries a rubber ring, P, around its periphery, to fit into the groove of the armature-pulley L. The rubber ring may be in the form of a flat ring or a round cord stretched into the grooved edge of the pulley, as shown, for the purpose of producing the necessary friction to rotate the armature when the crank is turned. The constant or frequent use of the generator causes the rubber ring to wear away, and therefore reduce the friction to such an extent as to prevent the transmission of motion from one pulley to the other; and to overcome this defect I make the larger or driving pulley adjustable, to compensate for the wear of the ring, by employing an adjustable bearing for the crank-shaft. This bearing is composed of a tube, R, having a plate, S, cast upon its outer end, and is extended through a slot in the arm O, between the magnets, so that the plate S shall bear against the outer side of the arm, where it is held by the screws T. The ends of the plate are slotted for the passage of the screws, and therefore, when the screws are loosened, the plate can be adjusted on the arm to move the driving-pulley nearer to or farther from the armature-pulley, for the purpose above stated.

The generator may be secured within its box by passing screws through the end of the latter into the outer face of the cylinder at the points *u u*, and by a screw through the bottom of the box entering one of the clamping-blocks E, which rests upon the bottom. Any other convenient mode may be employed, however, for securely fastening the generator in place.

Having thus described my invention, I claim as new—

1. The mode of constructing the cylinder of a magneto-engine or electric generator by casting the brass portions or sides upon the iron plates with a dovetail lock, substantially as described.

2. The compound metal cylinder of a magneto-engine or electric generator having its plates secured together by dovetail locks, substantially as described.

3. In a magneto-engine or electric generator, a cast cylinder composed of alternate plates of magnetic and diamagnetic metals, substantially as described.

In testimony of which invention I hereunto set my hand.

ARTHUR E. BRIGGS.

Witnesses:
JEPTHA D. GARRARD,
JOSEPH COX, Jr.